United States Patent
Gangi et al.

(10) Patent No.: US 8,806,443 B2
(45) Date of Patent: Aug. 12, 2014

(54) METHOD FOR MONITORING CONTROL DEVICES

(75) Inventors: Marco Gangi, Stuttgart (DE); Gerit Von Schwertfuehrer, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 1242 days.

(21) Appl. No.: 11/920,020

(22) PCT Filed: May 8, 2006

(86) PCT No.: PCT/EP2006/062113
§ 371 (c)(1),
(2), (4) Date: Dec. 23, 2008

(87) PCT Pub. No.: WO2006/120174
PCT Pub. Date: Nov. 16, 2006

(65) Prior Publication Data
US 2009/0254200 A1    Oct. 8, 2009

(30) Foreign Application Priority Data
May 9, 2005    (DE) .......................... 10 2005 021 986

(51) Int. Cl.
G06F 9/44      (2006.01)
G06F 11/07    (2006.01)
G06F 11/28    (2006.01)

(52) U.S. Cl.
CPC .......... *G06F 11/076* (2013.01); *G06F 2201/86* (2013.01); *G06F 11/28* (2013.01)
USPC ........................... 717/127; 717/131; 717/133

(58) Field of Classification Search
USPC ............. 717/124–35, 124–351; 709/220–231
See application file for complete search history.

(56) References Cited

U.S. PATENT DOCUMENTS

| | | | | |
|---|---|---|---|---|
| 5,257,373 A * | 10/1993 | Kurihara et al. | ............... | 717/124 |
| 5,408,650 A * | 4/1995 | Arsenault | ...................... | 717/124 |
| 5,768,152 A * | 6/1998 | Battaline et al. | .............. | 702/186 |
| 6,076,026 A * | 6/2000 | Jambhekar et al. | .......... | 701/29.6 |
| 7,448,025 B2 * | 11/2008 | Kalafatis et al. | .............. | 717/128 |
| 7,974,793 B2 * | 7/2011 | Weddle | ............................. | 702/58 |
| 2002/0184568 A1* | 12/2002 | Kurrasch | ........................ | 714/39 |
| 2005/0198620 A1* | 9/2005 | Mathiske et al. | ............. | 717/124 |

FOREIGN PATENT DOCUMENTS

| | | |
|---|---|---|
| DE | 199 46 031 | 3/2001 |
| DE | 100 61 001 | 6/2002 |

OTHER PUBLICATIONS

Nicholas Halbwachs, Paul Caspi, Pascal Raymond, and Daniel Pilaud, the Synchronous Data Flow Programming Language LUSTRE, Proceedings of the IEEE, vol. 79, No. 9, September 1991, pp. 1305-1320.*

Arkadeb Ghosal, Thomas A. Henzinger, Christoph M. Kirsch, and Marco A.A. Sanvido, Event-Driven Programming with Logical Execution Times, HSCC 2004, LNCS 2993, pp. 357-371.*

Michael A. Schuette and John P. Shen, Exploiting Instruction-Level Parallelism for Integrated Control-Flow Monitoring, IEEE Transactions on Computers. vol. 43. No. 2 . Feb. 1994, pp. 129-140.*

* cited by examiner

*Primary Examiner* — Satish Rampura
(74) *Attorney, Agent, or Firm* — Kenyon & Kenyon LLP

(57) ABSTRACT

A method for carrying out a control device monitoring, a program flow control being implemented for at least one event-synchronous process in the control device monitoring. The monitoring module is developed for carrying out a control device monitoring, A program flow control is implemented for at least one event-synchronous process in the control device monitoring.

18 Claims, 1 Drawing Sheet

METHOD FOR MONITORING CONTROL DEVICES

FIELD OF THE INVENTION

The present invention relates to a method for monitoring control devices, a monitoring module for monitoring control devices, a computer program having program code means and a computer program product having program code means.

BACKGROUND INFORMATION

The monitoring of control devices is usually performed using a program execution control for time-synchronous processes. This program flow control ensures that, for the control device monitoring, important program parts are run through cyclically in a specified time pattern and in a specified sequence. Accordingly, the control device monitoring is tied to a fixedly specified scheme in time.

German Patent Application No. DE 100 61 001 describes a method for controlling technical procedures. In this context, a control program is processed wherein the control program is subdivided into several tasks, and each task includes at least one process. Individual processes of the tasks are listed in the sequence of their processing, in this instance. A process sequence stored during the processing of the control program is thus able to be reproduced completely.

SUMMARY OF THE INVENTION

The present invention relates to a method for carrying out a control device monitoring, a program flow control being implemented for at least one event-synchronous process in the control device monitoring.

By the use of this method, it is possible to broaden common time-synchronous program flow controls by implementing the program flow control for event-synchronous processes in the control device monitoring, which can specify a scheme for monitoring the control device.

The control device monitoring should particularly be carried out for a control device that is developed for the regulation, control, influencing and the like of a system. In this context, it is provided that at least one event occurs for the system and/or within the system. Consequently, the program flow control for the control device monitoring takes place synchronously with the at least one event. The control device monitoring and the implemented program flow control can accordingly be aligned with a method of functioning of the control device, so that the control device monitoring is carried out as a function of, and/or consideration of the at least one event.

Control devices can be used in different mechatronic systems, for instance, motor vehicles or commercial vehicles. Using these control devices, different systems, for which the events occur and/or operate during an operation, can be controlled. Consequently, it is possible to take into consideration various real operating states, that can be characterized by the events, for control device monitoring.

In a preferred embodiment, a program flow control for at least one rotational speed-synchronous process can be implemented as a special event-synchronous process, in the control device monitoring.

The monitoring module according to the present invention is developed for carrying out a control device monitoring, a program flow control for at least one event-synchronous process being implemented in the control device monitoring.

The computer program according to the present invention, having program code means, is provided to implement all steps of the method according to the present invention, when the computer program is executed on a computer or a corresponding computing unit, especially in the monitoring module according to the present invention.

The computer program product according to the present invention having program code means, that are stored on a computer-readable storage medium, is suitable for executing all the steps of the method according to the present invention if the computer program is executed on a computer or a corresponding computing unit, in particular in a monitoring module according to the present invention.

DETAILED DESCRIPTION

Figure 1:
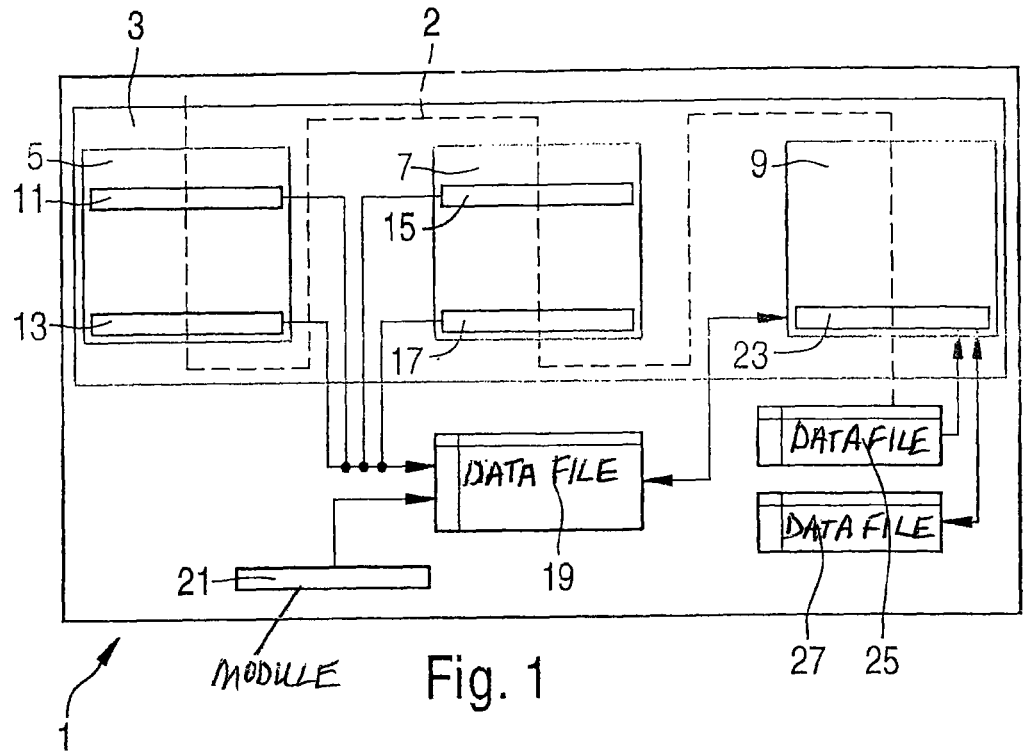
FIG. 1 shows, in a schematic representation, a diagram relating to a program flow control for time-synchronous processes.

In the usual methods for control device monitoring, a program flow control 1 is provided for time-synchronous processes. It follows a program flow 2, shown in the diagram in FIG. 1 by a dashed, meandering line, which progresses according to a specified scheme in time. In the present case, program flow control 1 includes a task 3, which includes several processes 5, 7, 9 which, according to program flow 2, are run through or processed one after the other.

In a first process 5, a first query 11 is first of all carried out as a function of a first check word: "MoCPFC_Set(Checkword A)". This is followed by a response 13: "MoCPFC_Check( )". Correspondingly, in an additional process 7 that follows in the course of program flow 2, there follows a query 15, which is carried out as a function of a second check word. "MoCPFC_Set(Checkword Z)", whereupon a response 17 ensues: "MoCPFC_Check( )". These queries 11, 15 and the results of responses 13, 17 are supplied to a data file 19 "PFC state data for task", as shown by the bent arrows. This data file 19 includes a counter "MoCPFC_Counter", query words "MoCPFC_Checkword", check sums "MoCPFC_Checksum" as well as partial responses "MoCPFC_PartResp". Data for this data file 19 are supplied from an additional module 21 "MoCCom_Co_proc( )".

To close query 3, program flow 2 arrives at a closing process 9 "MoCPFC". This closing process 9 is ended by a comparison 23 "MoCPFC_End( )", between this comparison 23 and data file 19, an exchange of data takes place, as shown by the bent double arrow. Furthermore, start commands "MOCPFC_START_ID" and/or restart commands "MOCPFC_RESTART_ID" are transferred to this comparison 23 from a data file 25, for configuration data "PFC configuration data, which is at the end of the program flow. Moreover, as indicated by the bent double arrow, between comparison 23 and a data file 27 "MoCCom data", which includes query routines such as "MoCCom_stQueryNew", "MoCCom_Query", an exchange of data takes place.

This program flow control 1 ensures that, for the control device monitoring, important program parts are run through cyclically in a specified time pattern and in a specified sequence, in this case, following program flow 2. A process 5, 7 and a program module are recognized as being processed if they are begun correctly and terminated correctly. In this connection, a module frame for a process 5, 7 in the form of an initial processing, in this case a query 11, 15 and a final processing, in this case a response 13, 17 has to be sufficient for the following conditions (A) through (D):

(A) Every respective process 5, 7 and every respective module has to be processed in a specified time pattern. A processing of the program flow control 1 must be constantly active, so as not to permit any errors within a processing pattern.

(B) A missing processing of one of processes 5, 7 must not be able to be replaced by a single or multiple processing of another process 7, 5 or module.

(C) Errors within a program flow of important program parts have to lead to a specified error reaction.

(D) For different queries 11, 15, program flow control 1 has to lead to different responses 13, 17, in order to prevent that a sequence control that has once run through correctly will constantly lead to the correct response. Furthermore, a safeguarding of a memory (TOM) in an established area has to take place separately, in order to ensure that a program code between the initial and final processing of program modules is correct.

Conditions or requirements (A), (B) and (C), that were named above, can be fulfilled because of a module-specific establishment of individual module detections and their steady, cyclical processing to form partial responses to queries of a separate hardware monitoring module. The last requirement, (D), fulfills the merging of stipulated queries into program flow control 1 to form reponses.

The control device monitoring for time-synchronous processes, as shown in FIG. 1, presupposes that the program parts are processed time-synchronously and that response contributions are supplied time-synchronously and cyclically to databank 19.

Figure 2:
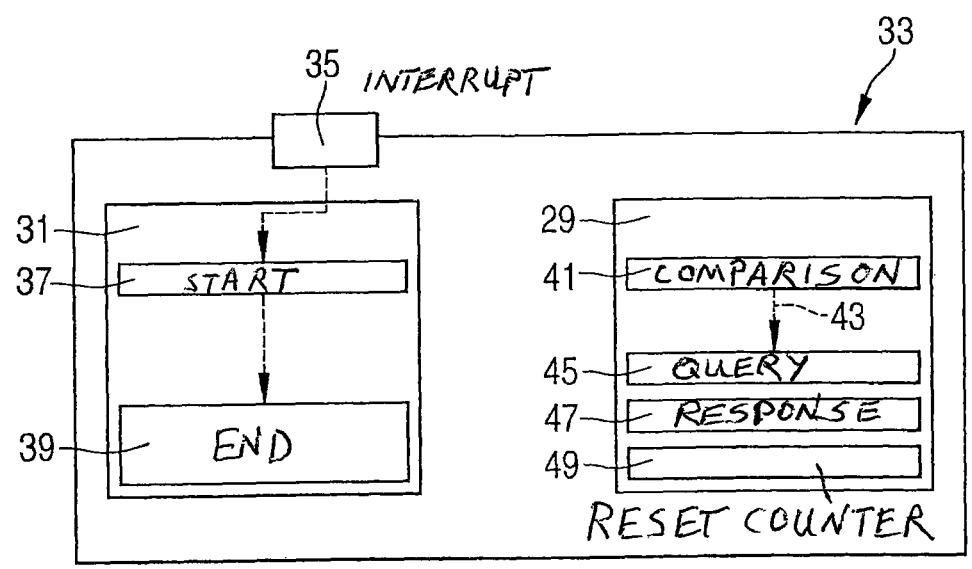
FIG. 2 shows, in a schematic representation, a diagram of a preferred embodiment of a program flow control for at least one event-synchronous process, implemented in a control device monitoring.

In a schematic representation, FIG. 2 shows a preferred specific embodiment of a program flow control 33 for time-synchronous processes 33, which is implemented into a control device monitoring, for generating a response contribution from a time-synchronous sub-process 29 "t-snc Sub-Process A2", using a plausible counter reading from an event-synchronous process 31 "n-sync. Process A1" within a program flow control 33.

Starting from an interrupt 35 for an event-synchronous function part or event-synchronous process 31, an identifier "set Flag" is set at beginning 37 of a program code. If, at the end 39 of the program code of the event-synchronous process 31, this identifier is still set, a counter is incremented "increase counter", and the identifier is subsequently reset again "reset flag".

This counter is evaluated and analyzed or valued into time-synchronous sub-process 29. By comparison 41 of a counter reading "check counter value" having event-dependent, applicable and usable window boundaries, and in a special case having rotational speed-dependent window boundaries, a plausibility check 43 is carried out with regard to counter reading 41. These window boundaries have to be applied or used while taking into consideration the expected callup frequency of event-synchronous process 31 and of the time pattern of time-synchronous sub-process 29.

After plausibility check 43, as was brought out in FIG. 1, there takes place a query 45 after a check word "MoCPFC_Set(Checkword Z)" as well as a corresponding response 47 "MoCPFC_Check( )". Thereafter, a resetting 49 "reset counter" of the counter reading can take place. If the event-synchronous counter reading, related to a working point, in this case, the rotational speed, is plausible, a response contribution for the event-synchronous functional component is sent from time-synchronous sub-process 29 according to response 49. If the counter reading is implausible with respect to the working point, no response contribution is sent, that is, after a debounce, an error response is carried out. After the sending of the response contribution, the counter in time-synchronous sub-process 29 is reset to zero again.

The method presented is implementable by the deactivation of event-synchronous processes 31, which supply a contribution to response 47 for program flow control 33, by subsequent error response at debounced activation of an output stage of a control device.

In the case of the above-mentioned specified error response, what is involved is a deactivation, performed after a debouncing, of a system to be controlled by the control device. In this connection, the system is transferred into a safeguarded state. In one possible specific embodiment, such a system may be an end of injection stage for shutting off an injection within a motor vehicle.

A proper execution of program parts of the control device monitoring is monitored for various control devices using the so-called MISR check sum method. A result of program flow control 33 goes as a partial response into the query communication/response communication having a monitoring module.

The method can be used for all control devices in which a program flow control is implemented for the control device monitoring.

What is claimed is:

1. A method for carrying out a control device monitoring, comprising:
   implementing a program flow control including at least one event-synchronous process and at least one time-synchronous sub-process in the control device monitoring,
   setting a flag in the at least one event-synchronous process at a beginning of a program code, and checking the flag at an end of the program code, and, if the flag has been set, increasing a counter and subsequently resetting the flag again, and
   evaluating the counter by the at least one time-synchronous sub-process;
   wherein at the beginning of the event synchronous process a flag is set, and wherein at the end of the event-synchronous process it is again determined whether this flag has been set and only if this is true, then the value of the counter is increased, and
   wherein there is a first task at the beginning of the program code in which a flag is set, wherein there is a second task at the end of the program code, in which the flag is checked, and if the flag has been set, the counter is increased and the flag is reset, and wherein these two tasks occur within the event synchronous process, so that there is a check of whether this process has been started and there is also a check of whether this process has started and ended.

2. The method according to claim 1, wherein the control device is for controlling a system for which at least one event occurs, the control device monitoring being carried out synchronously with the at least one event.

3. The method according to claim 1, further comprising:
   applying event-dependent window boundaries, while accounting for an expected call-up frequency of the at least one event-synchronous process and a time pattern of the at least one time-synchronous sub-process.

4. The method according to claim 3, further comprising:
   comparing a counter reading to event-dependent window boundaries and carrying-out a plausibility check, and one of sending a response contribution for an event-synchronous process and carrying-out an error response, as a function of a result of the plausibility check.

5. The method according to claim 4, further comprising: setting the counter to zero after the sending of the response contribution.

6. The method according to claim 1, wherein the program flow control is implemented for at least one rotational speed-synchronous process in the control device monitoring.

7. The method according to claim 1, further comprising: applying event-dependent window boundaries, while accounting for an expected call-up frequency of the at least one event-synchronous process and a time pattern of the at least one time-synchronous sub-process;
wherein the control device is for controlling a system for which at least one event occurs, the control device monitoring being carried out synchronously with the at least one event.

8. The method according to claim 7, wherein the program flow control is implemented for at least one rotational speed-synchronous process in the control device monitoring.

9. The method according to claim 7, further comprising: comparing a counter reading to event-dependent window boundaries and carrying-out a plausibility check, and one of sending a response contribution for an event-synchronous process and carrying-out an error response, as a function of a result of the plausibility check; and
setting the counter to zero after the sending of the response contribution.

10. The method according to claim 9, wherein the program flow control is implemented for at least one rotational speed-synchronous process in the control device monitoring.

11. The method according to claim 1, wherein the setting the flag and checking the flag are two tasks that occur within the event-synchronous process, so that whether the event-synchronous process has been started is checked, and whether the event-synchronous process has started and ended by increasing the counter and subsequently resetting the flag is also checked, so as to indicate that the event-synchronous process had been processed properly between the start and the end.

12. The method according to claim 1, wherein there is a check of whether this process has been started and there is also a check of whether this process has started and ended, so as to indicate with a high probability that the event synchronous process had been processed properly between the start and the end.

13. A monitoring module for carrying out a control device monitoring, comprising:
a processor configured to:
execute a program flow control being implemented to include at least one event-synchronous process and at least one time-synchronous sub-process in the control device monitoring,
set a flag in the at least one event-synchronous process at a beginning of a program code, and checking the flag at an end of the program code, and, if the flag has been set, increasing a counter and subsequently resetting the flag again, and
evaluate the counter by the at least one time-synchronous sub-process;
wherein at the beginning of the event synchronous process a flag is set, and wherein at the end of the event-synchronous process it is again determined whether this flag has been set and only if this is true, then the value of the counter is increased, and
wherein there is a first task at the beginning of the program code in which a flag is set, wherein there is a second task at the end of the program code, in which the flag is checked, and if the flag has been set, the counter is increased and the flag is reset, and wherein these two tasks occur within the event synchronous process, so that there is a check of whether this process has been started and there is also a check of whether this process has started and ended.

14. A computer-readable non-transitory medium having a computer program, which is executable by a processor, comprising:
a program code arrangement having program code for carrying out a control device monitoring by performing the following:
implementing a program flow control including at least one event-synchronous process and at least one time-synchronous sub-process in the control device monitoring;
setting a flag in the at least one event-synchronous process at a beginning of a program code, and checking the flag at an end of the program code, and, if the flag has been set, increasing a counter and subsequently resetting the flag again; and
evaluating the counter by the at least one time-synchronous sub-process;
wherein at the beginning of the event synchronous process a flag is set, and wherein at the end of the event-synchronous process it is again determined whether this flag has been set and only if this is true, then the value of the counter is increased, and
wherein there is a first task at the beginning of the program code in which a flag is set, wherein there is a second task at the end of the program code, in which the flag is checked, and if the flag has been set, the counter is increased and the flag is reset, and wherein these two tasks occur within the event synchronous process, so that there is a check of whether this process has been started and there is also a check of whether this process has started and ended.

15. The computer-readable non-transitory medium according to claim 14, wherein event-dependent window boundaries are applied, while accounting for an expected call-up frequency of the at least one event-synchronous process and a time pattern of the at least one time-synchronous sub-process, and wherein the system being controlled is one for which at least one event occurs, the control device monitoring being carried out synchronously with the at least one event.

16. The computer-readable non-transitory medium according to claim 15, wherein the program flow control is implemented for at least one rotational speed-synchronous process in the control device monitoring.

17. The computer-readable non-transitory medium according to claim 15, wherein a counter reading is compared to event-dependent window boundaries and a plausibility check is carried out, wherein one of the following is performed (i) a response contribution for an event-synchronous process and (ii) an error response, as a function of a result of the plausibility check, and wherein the counter is set to zero after the sending of the response contribution.

18. The computer-readable non-transitory medium according to claim 17, wherein the program flow control is implemented for at least one rotational speed-synchronous process in the control device monitoring.

* * * * *